(12) United States Patent
Martens

(10) Patent No.: US 12,209,868 B2
(45) Date of Patent: Jan. 28, 2025

(54) METHOD AND APPARATUS FOR DETECTING DEVIATIONS FROM MAP DATA

(71) Applicant: TomTom Global Content B.V., Amsterdam (NL)

(72) Inventor: Gaëtan Martens, Zarlardinge (BE)

(73) Assignee: TomTom Global Content B.V., Amsterdam (NL)

( * ) Notice: Subject to any disclaimer, the term of this patent is extended or adjusted under 35 U.S.C. 154(b) by 0 days.

(21) Appl. No.: 18/513,362

(22) Filed: Nov. 17, 2023

(65) Prior Publication Data

US 2024/0159543 A1     May 16, 2024

Related U.S. Application Data

(63) Continuation of application No. 13/932,067, filed on Jul. 1, 2013, now Pat. No. 11,828,601.

(30) Foreign Application Priority Data

Jun. 29, 2012    (GB) ........................................ 1211636

(51) Int. Cl.
*G01C 21/26*     (2006.01)
*G01C 21/00*     (2006.01)

(52) U.S. Cl.
CPC .......... *G01C 21/26* (2013.01); *G01C 21/3815* (2020.08); *G01C 21/3841* (2020.08); *G01C 21/3844* (2020.08)

(58) Field of Classification Search
CPC ............... G01C 21/26; G01C 21/3841; G01C 21/3844; G01C 21/3815
See application file for complete search history.

(56) References Cited

U.S. PATENT DOCUMENTS 6,385,539 B1    5/2002   Wilson et al.
7,627,414 B2   12/2009   Goto et al.
(Continued)

FOREIGN PATENT DOCUMENTS

EP     0921509 A2    6/1999
GB     2428852 A     2/2007
(Continued)

OTHER PUBLICATIONS

Dee, Hannah M., David C. Hogg, and Anthony G. Cohn. "Scene modelling and classification using learned spatial relations." Spatial Information Theory: 9th International Conference, COSIT 2009 Aber Wrac'h, France, Sep. 21-25, 2009 Proceedings 9. Springer Berlin Heidelberg. (Year: 2009).*

(Continued)

*Primary Examiner* — Mohsen Almani
(74) *Attorney, Agent, or Firm* — Park, Vaughan, Fleming & Dowler LLP

(57) ABSTRACT

Embodiments of the present invention provide a method for identifying discrepancies in digital map data, comprising selecting one or more candidate locations as a subset of locations within positional data relating to the movement of a plurality of devices with respect to time in an area, allocating each of the candidate locations to one or more predetermined categories based upon a distribution of travel directions of the devices at each candidate location and comparing the candidate locations against a database of map data and identifying locations of possible discrepancies in the digital map data based upon the category of each candidate location.

18 Claims, 6 Drawing Sheets

(56) References Cited

U.S. PATENT DOCUMENTS

| | | | |
|---|---|---|---|
| 2007/0032946 | A1 | 2/2007 | Goto et al. |
| 2010/0256903 | A1* | 10/2010 | Johnson ............. G01C 21/3415 701/533 |
| 2012/0093396 | A1* | 4/2012 | Dai ....................... G06F 18/217 382/159 |
| 2012/0271542 | A1* | 10/2012 | Arcot .................. G06V 20/582 701/411 |
| 2015/0153183 | A1* | 6/2015 | Kadous .............. G01C 21/3815 701/532 |

FOREIGN PATENT DOCUMENTS

| | | |
|---|---|---|
| WO | 2009059766 A1 | 5/2009 |
| WO | 2011023247 A1 | 3/2011 |

OTHER PUBLICATIONS

Davies, Jonathan J., Alastair R. Beresford, and Andy Hopper. "Scalable, distributed, real-time map generation." IEEE Pervasive Computing 5.4. (Year: 2006).*

McCullagh, Peter, and Jie Yang. "Stochastic classification models." International Congress of Mathematicians. vol. 3. No. 669-686. (Year: 2006).*

Chan, Jonathan Cheung-Wai, Kwok-Ping Chan, and Anthony Gar-On Yeh. "Detecting the nature of change in an urban environment: A comparison of machine learning algorithms." Photogrammetric engineering and remote sensing 67.2 . (Year: 2001).*

Neagoe, Victor-Eil, Mihai Neghina, and Mihai Datcu. "Neural network techniques for automated land-cover change detection in multispectral satellite time series imagery." International journal of mathematical models and methods in applied sciences 6.1. (Year: 2012).*

Schroedl et al., "Mining GPS Traces for Map Refinement," Data Mining and Knowledge Discovery, vol. 9, Jul. 2004.

S. Cha et al., "Distance between histograms of angular measurements and its application to handwritten character similarity," 2000 (ISBN: 0-7695-0750-6).

* cited by examiner

METHOD AND APPARATUS FOR DETECTING DEVIATIONS FROM MAP DATA

CROSS-REFERENCES TO RELATED APPLICATIONS

The instant application is a continuation application of, and hereby claims priority to, U.S. application Ser. No. 13/932,067, which was filed on 1 Jul. 2013. The instant application also claims priority, via parent application Ser. No. 13/932,067, to United Kingdom patent application 1211636.4 filed on 29 Jun. 2012. The entire contents of each of these applications is incorporated herein by reference.

FIELD OF THE INVENTION

This invention relates to methods of identifying locations at which discrepancies or deviations exist between real world features and digital map data intended to represent those features. The real world features include navigable features (features traversable by a vehicle) such as road segments. Embodiments of the invention aim to automate a process of detecting and identifying such discrepancies to reduce a required intervention of an operator.

BACKGROUND TO THE INVENTION

Electronic map data is used in a wide variety of applications. One particular application is routing, such as in navigation devices. The accuracy of the routing is consequently dependent upon the accuracy of the map data. However, real world features, such as the layout of road networks which the map data is intended to represent, continually change and it is therefore required to keep the map data up-to-date. The map data for a country such as the Netherlands or the United Kingdom is large in size and map data for the US is enormous. Attempting to maintain the map data manually is an extremely difficult, or near impossible, task.

Various technologies can be used to assist in maintaining map data. The technologies include satellite imagery and positional data relating to the movement of a plurality of devices with respect to time in an area. The devices may be carried by mapping vehicles intended to assist in maintaining or acquiring map data, or may be a vehicle carrying a navigation device.

It is an object of embodiments of the invention to at least mitigate one or more of the problems of the prior art.

SUMMARY OF THE INVENTION

According to a first aspect of the invention, therein is provided a method for identifying discrepancies in digital map data, comprising:
  selecting one or more candidate locations as a subset of locations within positional data relating
  to the movement of a plurality of devices with respect to time in an area;
  allocating each of the candidate locations to one or more predetermined categories based upon a distribution of travel directions of the devices at each candidate location; and
  comparing the candidate locations against a database of map data and identifying locations of possible discrepancies in the digital map data based upon the category of each candidate location.

The method may further comprise determining the distribution of travel directions as a directional histogram. A rotation invariant histogram may be determined based upon the directional histogram. The step of allocating each of the candidate locations to one or more predetermined categories may be based upon the directional histogram or the invariant histogram, and in preferred embodiments is performed by a trained model.

The method may further comprise determining an association between proximate candidate locations based upon the distribution of travel directions at each candidate location. The association may be determined, at least in part, based upon a metric indicative of a similarity between the distribution of travel directions for adjacent candidate locations. The comparing of the candidate locations against the database of map data may comprise comparing the category and association of each candidate location against the map data.

The step of comparing the candidate locations against a database of map data may be performed by using a function $F(L, \{c_1 \ldots c_k\}, \{L_1 \ldots L_k\})$, wherein the association of a candidate location c may be identified as $\{c_1 \ldots c_k\}$ having corresponding classifications of $\{L_1 \ldots L_k\}$ and an output of the function expresses a likelihood of a possible discrepancy in the digital map data at the candidate location. The function F may be a trained model.

The candidate locations may be selected by determining locations of local maxima in the positional data.

The method may further comprise a step of allocating the positional data to a pixel map corresponding to the area and determining, for at least pixels traversed by one or more devices, a value indicative of the number of devices traversing each pixel in the positional data. The candidate locations may be selected according to:

$$x_{cent} = \frac{\sum_i x_i v_i}{\sum_i v_i}, \text{ and } y_{cent} = \frac{\sum_i y_i v_i}{\sum_i v_i},$$

where $x_i$, $y_i$, are the coordinates of a pixel in the pixel map having a greater value than its adjacent pixels and $v_i$ is the value of the pixel.

According to a second aspect of the invention, there is provided a method of training a model to classify features in positional data, comprising:
  providing a training set comprising a plurality of distributions of travel directions of navigation devices, each distribution having an associated category identifier; and
  training a classification model to classify travel direction distributions based upon the training set.

The category identifier may be indicative of each distribution of travel directions being one of a 1-way road, a 2-way road, a junction and clutter.

The method may comprise evaluating the trained classification model using a test set comprising a plurality of travel distributions having unknown category identifiers.

The method may comprise training a second classification model to identify possible discrepancies in digital map data based upon the category of each candidate location and an association of each candidate location with proximate candidate locations. The second classification model may provide a function $F(L, \{c_1 \ldots c_k\}, \{L_1 \ldots L_k\})$, wherein the association of a candidate location c may be identified as $\{c_1 \ldots c_k\}$ having corresponding classifications of $\{L_1 \ldots$ $L_k$} and an output of the function F expresses a likelihood of a possible discrepancy in the digital map data at the candidate location. An output of the function F may be indicative of a likelihood of a discrepancy in the map data.

The classification model or the second classification model may be one of a stochastic model, a decision tree classifiers, rule-based classifiers, neural networks, support vector machines.

The method of the first aspect of the invention, in any of its embodiments, may comprise using the classification model generated in the second aspect of the invention to allocate each of the candidate locations to the one or more predetermined categories.

Any of the methods described above may be implemented as software, and thus the invention extends to computer software which, when executed by a computer, is arranged to perform any of the described methods. The computer software may be stored on a, e.g. non-transitory, computer-readable medium.

BRIEF DESCRIPTION OF THE DRAWINGS

Embodiments of the invention will now be described by way of example only, with reference to the accompanying figures, in which.

DETAILED DESCRIPTION OF PREFERRED EMBODIMENTS

Embodiments of the invention aim to identify locations at which discrepancies or deviations exist between real world features and digital map data intended to represent those features. The real world features include navigable features (features traversable by a vehicle) such as road segments. Embodiments of the invention aim to automate a process of detecting and identifying such discrepancies to reduce a required intervention of an operator.

Figure 1:
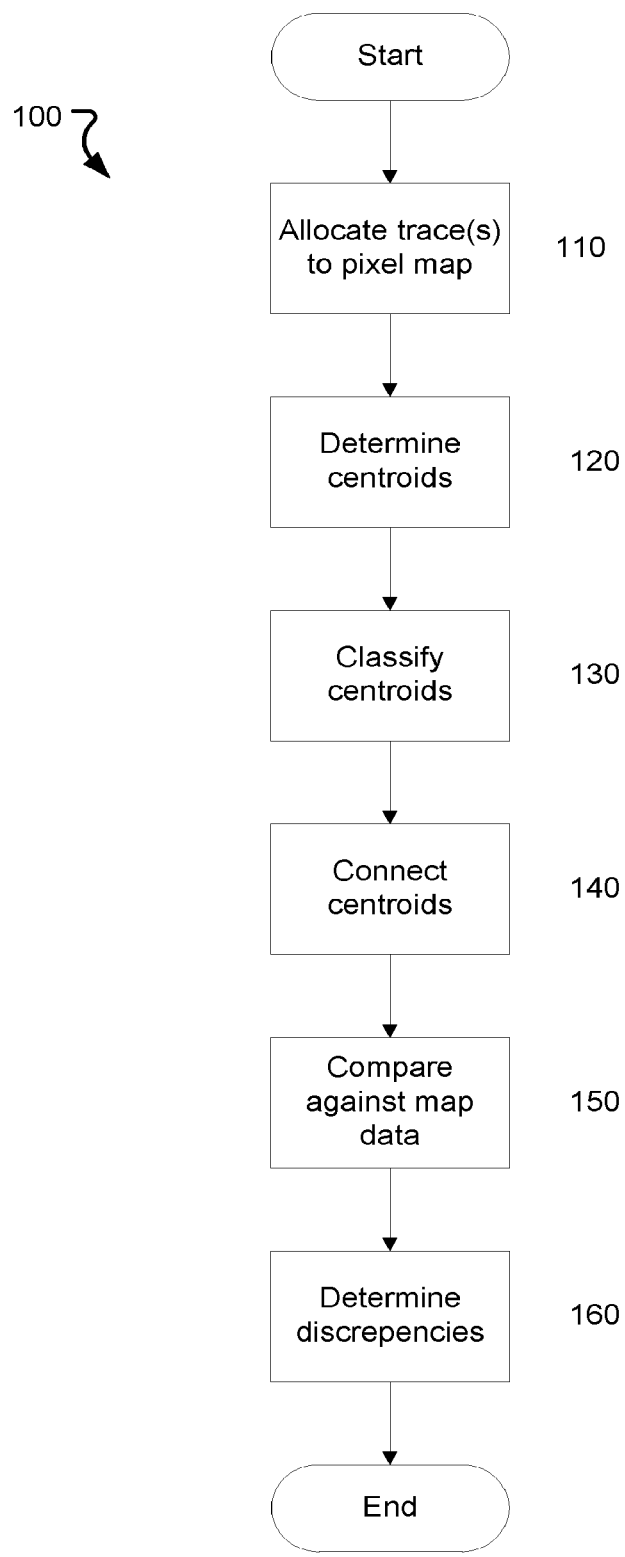
FIG. 1 is a flowchart illustrating a method for identifying discrepancies in digital map data according to an embodiment of the invention.

FIG. 1 illustrates a method 100 according to an embodiment of the invention. The method 100, when executed by a processor of a computing device, determines locations at which map data may differ from real world features which the map data is intended to represent. The method determines the locations based upon trace data comprising one or more traces from location-aware mobile devices. Each trace indicates a geographic position of each mobile device against time i.e. traces the path of the device.

A location-aware mobile device, herein referred to simply as a mobile device, is any device capable of determining its geographic location from wirelessly received signals. The received signals may include received GPS signals. The mobile device may be a navigation device such as a portable navigation device (PND), in-vehicle navigation device, mobile phone, portable computing device, vehicle tracking device, and the like. The following description will assume that the mobile device is a navigation device, although it will be realised that embodiments of the invention are not restricted in this respect.

The navigation device is arranged to record a trace of a path or route followed by the navigation device. The navigation device may store the trace in a local memory of the navigation device or may communicate the trace to a server computer, such as via a wireless data connection with the server computer. The trace may be formed from data indicative of a series of geographic locations at which the navigation device is located at periodic intervals. However in other embodiments the trace may be formed by data representing one or more curves indicative of the path of the navigation device. The method 100 may be used with trace data comprising one or more traces. In some embodiments of the invention the method 100 is used with a bundle comprising a plurality of traces. The plurality of traces may be received from one or more navigation devices. The method may comprise a step (not shown) of receiving the one or more traces from one or more mobile devices, such as navigation devices.

Figure 2:
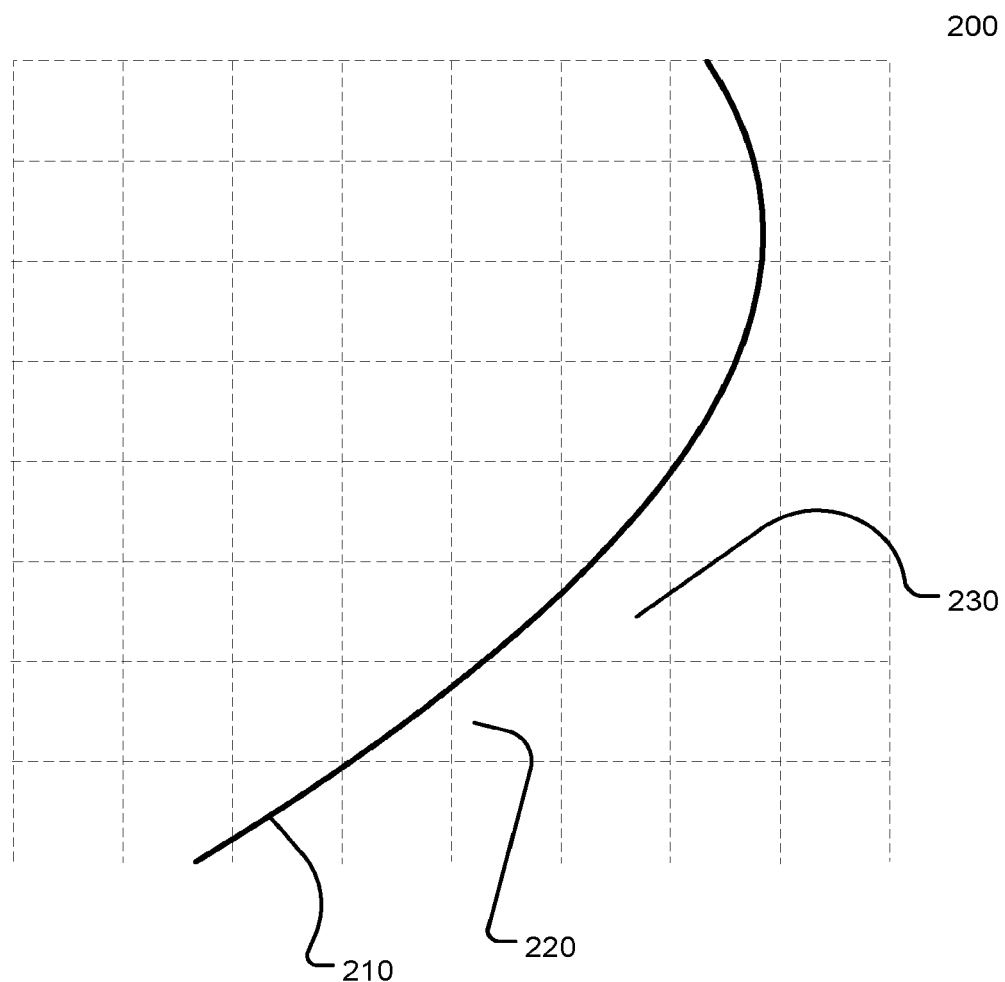
FIG. 2 illustrates an allocation of traces to a pixel map according to an embodiment of the invention.

In step 110 the one or more traces are allocated to a pixel map. FIG. 2 illustrates the allocation of a trace 210 to a pixel map 200. The pixel map is a two-dimensional array comprising a plurality of pixels each representative of a geographic area. Each pixel may represent a geographic area of any shape, although in the embodiment shown in FIG. 2 the pixel map comprises rectangular or square pixels. Rectangular pixels may be the most convenient shape to process by the method 100 executed by the processor and to store in a memory. The geographic area represented by each pixel may be of any size. The size may be dependent upon an accuracy to which the navigation device providing the probe data may determine its location. The area may be 5 m by 5 m, 3.5 m by 3.5 m or 2 m by 2 m, although it will be realised that these are merely exemplary and, furthermore, in some embodiments the height and width of the area may not be equal.

Each pixel stores a value indicative of a number of times that pixel is crossed by a trace. When the pixel map is initialised each pixel is set to a predetermined value, such as 0. The pixel value is incremented each time the pixel is crossed by a trace. Referring to FIG. 2, the value for pixels 220 and 230 is incremented, amongst others, to indicate that the trace 210 crosses those pixels. It will be noted that even in cases where the trace is formed from a plurality of location values each indicative of the location of the navigation device at periodic intervals, should the trace comprise two or more location values within one pixel the value for that pixel is only incremented once to indicate the trace crossing the pixel, rather than once for each location within the pixel area. The pixel map values are incremented to reflect the number of times each of one or more traces crosses each pixel. Thus step 110 results in pixels which are crossed a greater number of times by traces storing a greater value.

It will be appreciated that, in the real world, most navigation devices will travel routes along roads in a road network. Occasionally, navigation devices will follow routes across other types of navigable location including private areas such as parking lots and the like. However the traces crossing these locations will be expected to be more random i.e. less constrained to following a particular path. Therefore pixels having a higher probability of corresponding to road locations will be expected to store greater values following step 110.

Figure 3:
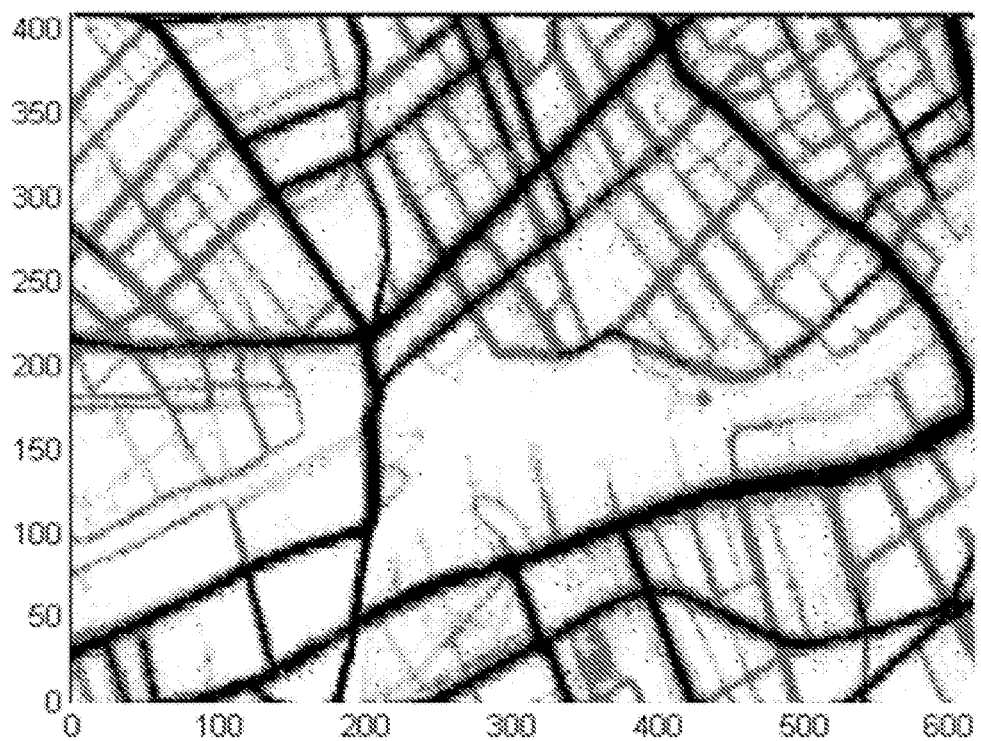
FIG. 3 is a heat map illustrating the pixel map according to an embodiment of the invention.

Following step 110 a heat map may be displayed representative of the pixel map as shown in FIG. 3. The heat map illustrates the values of the pixel map wherein brighter colours (those usually associated with higher temperatures) represent greater pixel values, i.e. more frequented locations. The axes of FIG. 3 indicate a distance in meters from an origin point at a bottom left corner of FIG. 3. It can be appreciated from FIG. 3 that most traces follow roads which appear in FIG. 3 in darker or similar "high temperature" colours whilst less traversed areas are indicated in lighter or similar "low temperature" colours. Based upon the pixel values it is possible to identify candidate locations having a relatively high probability of corresponding to navigable locations such as roadways, as will be described.

A direction map is also produced in step 110. The direction map represents, for each pixel traversed by at least one trace, the direction in which the trace(s) traversed the pixel.

A directional histogram is stored for each pixel of the pixel map. In some embodiments a directional histogram may only be stored for each pixel which is traversed by at least one trace i.e. a directional histogram may only be initialised for a pixel once it is traversed by a trace and its corresponding pixel value incremented. In other embodiments a directional histogram may be initialised for each pixel of the pixel map.

The directional histogram comprises a plurality of bins each representative of a direction of trace(s) across the corresponding pixel. Upon initialisation a value corresponding to each bin in the histogram is set to a predetermined value, such as 0. The value is incremented each time a trace traverses the corresponding pixel in that direction. In one embodiment the bins correspond to directions of 0° to 30°; 30° to 60°; . . . 330° to 0°, although it will be realised that these angular divisions are merely exemplary and that other angular divisions may be envisaged.

Thus for each pixel in the pixel map 200 shown in FIG. 2 a value indicates the number of times the pixel is traversed by a trace and, for at least the pixels traversed once by one or more traces, a directional histogram stores data indicative of the direction of the trace traversing the pixel.

In step 120 candidate locations in the probe data having a high probability of corresponding to navigable features such as roadways are identified. In one embodiment, the candidate locations are identified by determining pixels corresponding to local maxima of traversal frequency in the trace data. In other words, pixels are identified which are most crossed in the trace data. The coordinates ($x_{cent}$, $y_{cent}$) of the local maxima in the pixel map may be determined as:

$$x_{cent} = \frac{\sum_i x_i v_i}{\sum_i v_i} \quad y_{cent} = \frac{\sum_i y_i v_i}{\sum_i v_i}$$

wherein $x_i$, $y_i$ are the coordinates of the centre of mass of a pixel with a higher value than its adjacent pixels and $v_i$ is the value of the pixel.

Figure 4:
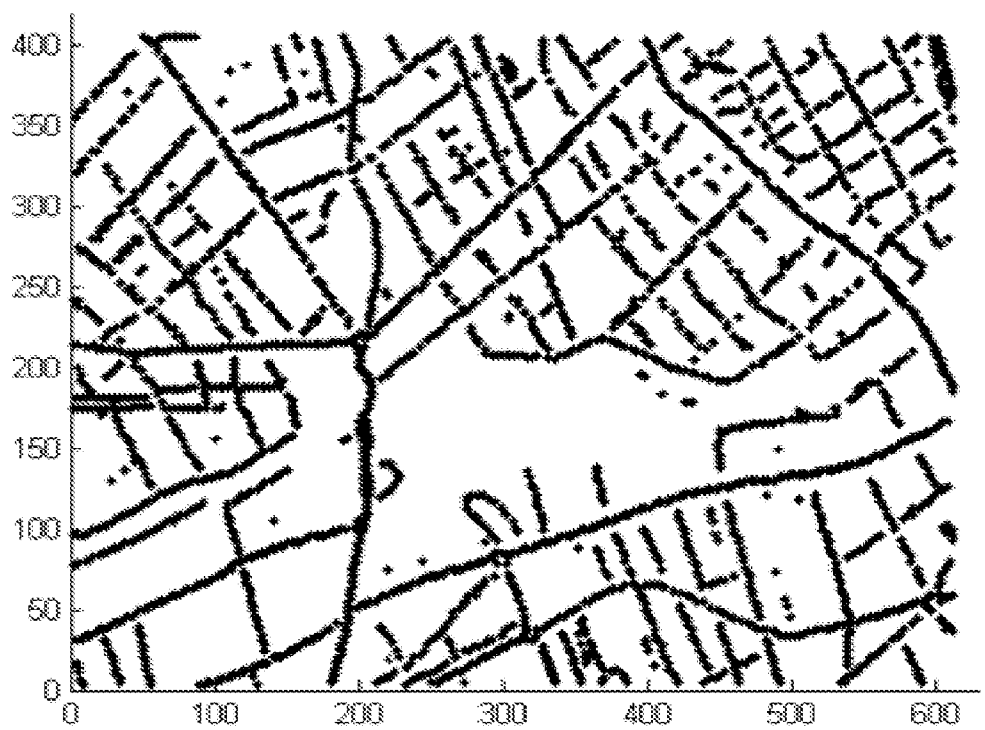
FIG. 4 is a map of centroids according to an embodiment of the invention.

The local maxima correspond to centroids which are pixel locations along roadway axles, or locations generally central along roads i.e. corresponding to a generally longitudinal axis of the road. Thus the centroids have a highest probability of corresponding to a spatial location of a road in the road network. FIG. 4 illustrates centroids identified from the pixel map illustrated in FIG. 3.

In step 130 the centroids identified in step 120 are classified. That is, in step 130 the centroids are assigned to one or more of a plurality of classifications. The classifications indicate a type of navigable feature based upon the direction map produced in step 120.

In order to classify the centroids, firstly in some embodiments of step 130, the directional histograms are normalised. The directional histograms may be normalised such that a sum of values in all bins of each directional histogram is uniform.

The directional histograms are transformed into rotation invariant representations. The rotation invariant histogram is obtained by circularly shifting bin values of each directional histogram. The bins values may be shifted such that a predetermined bin, such as the first bin, contains a greatest value. These steps may be explained with reference to a histogram h comprising 12 bins:

h=[0, 0, 0, 93, 0, 0, 26, 0, 0, 5, 0, 32]

Normalised histogram→h'=[0, 0, 0, 0.596, 0, 0, 0.167, 0, 0, 0.032, 0, 0.205]

Rotation invariant histogram→h"=[0.596, 0, 0, 0.167, 0, 0, 0.032, 0, 0.205, 0, 0, 0]

The conversion to the rotation invariant histogram allows a comparison between directional histograms to be made. By comparing the rotation invariant histograms they may be assigned to one of the plurality of categories. In some embodiments the histograms are classified by a stochastic model, such a Bayesian network which is trained to distinguish between histograms of the various categories. Other models may be useful such as decision tree classifiers, rule-based classifiers, neural networks, support vector machines and naive Bayes classifiers.

The categories relate to a type of navigable area which each centroid represents. In some embodiments, the classifications correspond to 1-way (unidirectional), 2-way (bidirectional), junction and clutter. A 1-way histogram typically has a large value (close to 1) for the first bin in the rotation invariant representation, with other bin values substantially 0. A 2-way histogram typically has values around 0.5 for bins 1 and 7 (in a 12 bin histogram, otherwise approximately half-way i.e. opposite bin 1). A junction histogram has a pattern to the bin values. Typically the pattern comprises more than 2 substantially non-zero bin values. For example, a four way junction may be represented by a histogram having bin values of substantially 0.25 at 90° intervals, although other arrangements of junction can be envisaged having different intersection angles. In some embodiments more than one category may be provided for different types or angular arrangement of junctions. A clutter histogram represents an area having unstructured or undirected traffic flow, such as a car park and may have non-zero values in all bins, or substantially a majority of bins.

Figure 7:
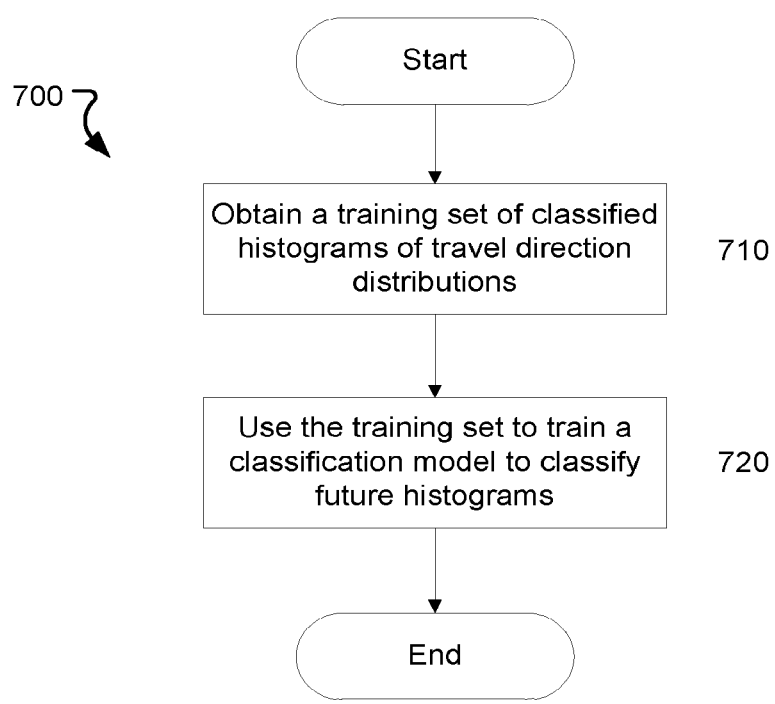
FIG. 7 is a flowchart illustrating a method of training a model to classify features in positional data according to an embodiment of the invention.

Prior to being used to classify the histogram, such a model is trained using the method 700 depicted in the flowchart of FIG. 7. In the method, a training set having a plurality of histograms is obtained (step 710), each histogram having an associated category. Thus a learning algorithm may train the model to associate an input histogram with the appropriate classification based upon the training set (step 720). The associated category is indicative of the histogram being representative of, for example, a 1-way road, a 2-way road, a junction and a clutter location. When trained, the performance of the model may be verified by using a verification set of histograms without associated categories being provided to the model, although the category of each histogram is known for comparison against the category assigned by the model. The model may be re-trained, if necessary, or to introduce additional categories i.e. representative of new junction layouts etc.

Figure 5:
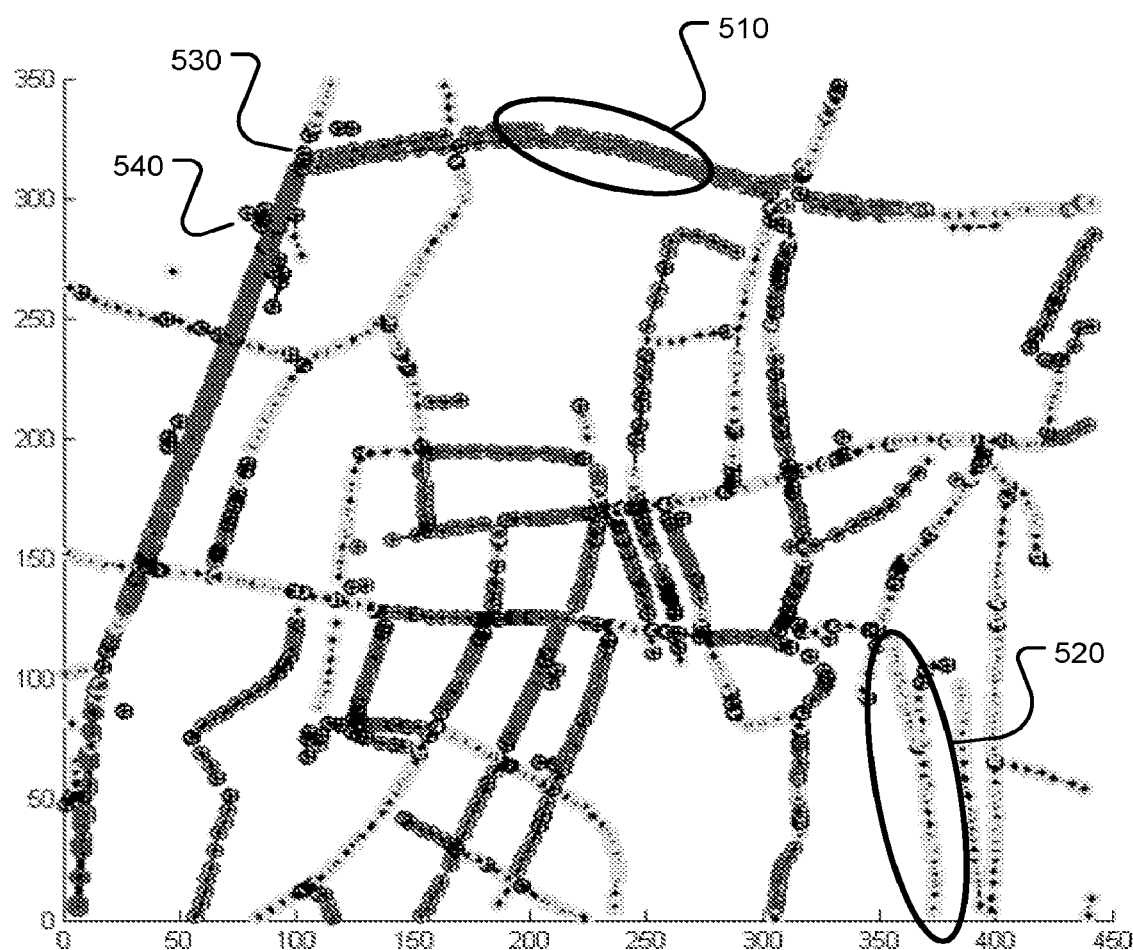
FIG. 5 is a map of classified centroids according to an embodiment of the invention.

FIG. 5 illustrates classified centroids representing an area in the city of Flanders. The centroids marked 510 represent exemplary 1-way centroids 510. The centroids marked 520 represent exemplary 2-way centroids. The centroid marked 530 is an example of an intersection centroid. The centroid marked 540 is an example of a clutter centroid.

In step 140, centroids are connected to adjacent or spatially close centroids based upon one or more characteristics. The characteristics in one embodiment comprise the directional histograms associated with each centroid. Centroids having similar characteristics are connected in step 140. The similarity of centroids may be expressed by a metric. The metric may take into account the fact that adjacent bins in the directional histograms are more indicative of similarity than distant bins. For example, that bins such as bin 11 and bin 0 (in a 12 bin histogram) are neighbouring bins, whereas bin 0 and bin 6 are opposite. Therefore the metric indicates the angular proximity of bins and similarity between directional histograms. Such a metric is used in the area of written text (character) recognition and has been applied by the present inventor to comparison of rotational histograms in the area of road network analysis. Further details are available in the publication *Distance between histograms of angular measurements and its application to handwritten character similarity*, Sung-Hyuk Cha; Srihari, S. N.; 2000 (ISBN: 0-7695-0750-6).

In step 150 the centroids are compared against digital map data representative of an area for which the trace data was obtained. The map data indicates, amongst other things, the road network in the area. As a result of the comparison any discrepancies or deviations between the map data and the real world may be identified in step 160.

Step 150 comprises, in some embodiments, a first part in which centroids are identified which do not correspond to a location of a road in the map data. In some embodiments, the digital map data is scaled to match a scale of the pixel map in order to enable a comparison between the centroids and the map data. A location of each centroid is then compared against the map data to determine if a road exists at that geographic location. If no road exists at that location, or at a location within a predetermined distance of the centroid, then the centroid is marked or flagged for further analysis. If there is a road at the geographic location of the centroid then the centroid may be discarded, i.e. eliminated from further analysis. In other embodiments, all centroids are marked for further analysis, i.e. including those which correspond to the location of roads in the map data. This allows centroids corresponding to roads in the map data to be further analysed to detect changed road properties, such as a road having changed from 1-way to 2-way.

Marked or flagged centroids are analysed to determine whether they relate to a deviation from the map data i.e. a location at which the map data is potentially incorrect. In the second part of step 160 the marked centroids are analysed to determine with a greater degree of confidence whether they correspond to such a deviation.

In embodiments of the invention, a marked centroid is determined to correspond to a deviation from the map data based upon its classification and connections.

As explained above, centroids may be classified and the classification of a marked centroid c may be indicated as L. In some embodiments, as noted above, the classifications L may be 1-way, 2-5 way, intersection or clutter, although it will be realised that these are merely exemplary. The connections of the marked centroid c may be identified as $\{c_1 \ldots c_k\}$ with corresponding classifications of $\{L_1 \ldots L_k\}$.

A function F may be arranged to output true or false to indicate whether the marked centroid c corresponds to a change from the map data based upon the classification of the marked centroid and its connections as:

$$F(L, \{c_1 \ldots c_k\}, \{L_1 \ldots L_k\})$$

For example, a marked centroid having no connections or being connected to only clutter centroids may be rejected. That is, the marked centroid may be determined not to represent a deviation or real-world change from the map data. This determination may be made on the basis that the classification and connections of the marked centroid do not indicate with significant reliability that the real world road network has changed from the map data. However, a marked centroid having a predetermined classification connected to a plurality of centroids of the same classification, e.g. a centroid classified as 1-way connected to four other similarly classified centroids, may be identified as a real-world change. As such the function F outputs true to indicate the determination of the marked centroid as a deviation from the map data. The function may be a heuristic function or be a trained model.

Figure 6:
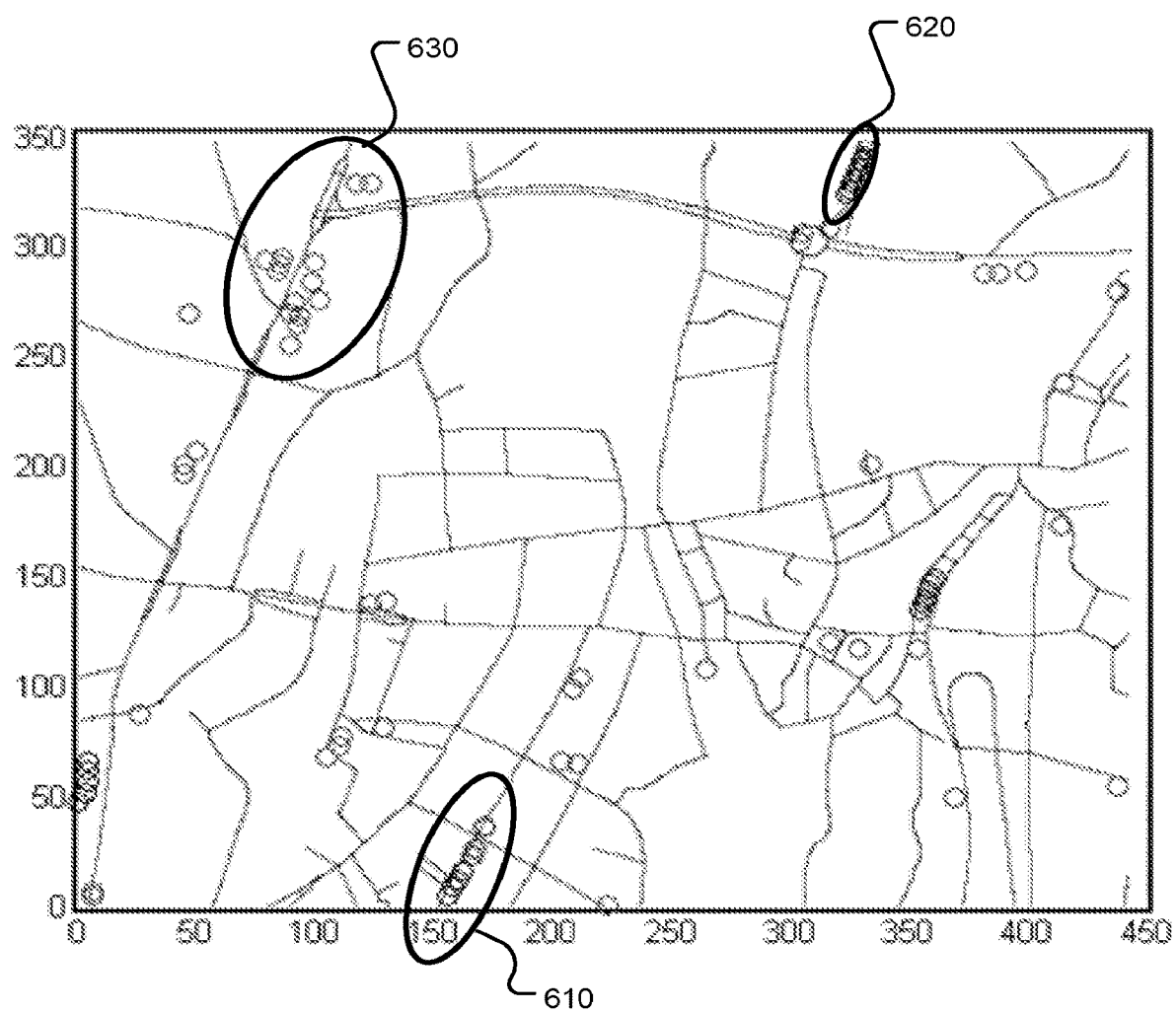
FIG. 6 is an illustration of digital map data and centroids determined to correspond to discrepancies from the digital map data according to an embodiment of the invention.

FIG. 6 illustrates centroids determined to correspond to deviations and not to correspond to deviations. First and second pluralities of centroids 610, 620 are identified to correspond to a change from the map data whereas a third plurality of centroids 630 (and others not specifically indicated in FIG. 6) are identified not to correspond to changes from the map data.

It will be appreciated that embodiments of the present invention assist in detecting deviations of map data and the real world represented by the map data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method, comprising:
   providing a training set including a plurality of distributions of travel directions of navigation devices and a respective category identifier associated with each of the distributions of travel directions, each respective category identifier identifying the associated distribution of travel directions as belonging to one or more categories from among a set of categories;
   training, based on the training set, a classification model to classify candidate locations having associated distributions of travel directions of navigation devices as belonging to one or more categories from among the set of categories;
   classifying, using the classification model, a plurality of candidate locations having associated distributions of travel directions as belonging to one or more categories from among the set of categories;
   identifying, using a second classification model, possible discrepancies in digital map data based on:
      the one or more categories to which belong the some or all of the candidate locations, and
      a similarity between respective categories to which belong each of one or more pairs of proximate candidate locations from among the candidate locations; and
   displaying, to a user, graphical elements overlaid on a map display, each of the graphical elements identifying a respective at least one of the possible discrepancies in the digital map data.

2. The method of claim 1, wherein:
   some or all of the distributions of travel directions of the plurality of distributions of travel directions and/or the associated distribution of travel directions for the candidate locations are represented via a respective directional histogram;
   each directional histogram includes a plurality of bins;
   each bin of the plurality of bins is associated with a different travel direction for traversal of a corresponding location; and
   each bin stores a representation of a number of devices that traversed the corresponding location in a respective travel direction.

3. The method of claim 1, further comprising:
   training the second classification model to identify possible discrepancies in digital map data.

4. The method of claim 1, wherein the second classification model is a function $D=F(L(c), \{C_1 \ldots C_k\}, \{L_1 \ldots L_k\})$, where D represents a likelihood of a discrepancy in the digital map data at a candidate location c, the proximate candidate locations of the candidate location c are identified as $\{C_1 \ldots C_k\}$, and the categories to which belong the proximate candidate locations of the candidate location c are identified as $\{L_1 \ldots L_k\}$.

5. The method of claim 4, wherein D includes at least one value representing the likelihood of discrepancy in the digital map data.

6. The method of claim 1, wherein second classification model is or includes a stochastic model.

7. The method of claim 1, wherein the second classification model is or includes a decision tree classifier, a rule-based classifier, a neural network, and/or a support vector machine.

8. The method of claim 1, wherein the set of categories includes: a 1-way road; a 2-way road; a junction; and clutter.

9. The method of claim 1, wherein the classification model is or includes a stochastic model, a decision tree classifier, a rule-based classifier, a neural network, and/or a support vector machine.

10. A system, comprising:
    a memory; and
    at least one processor, the at least one processor configured to:
       provide a training set including a plurality of distributions of travel directions of navigation devices and a respective category identifier associated with each of the distributions of travel directions, each respective category identifier identifying the associated distribution of travel directions as belonging to one or more categories from among a set of categories;
       train, based on the training set, a classification model to classify candidate locations having associated distributions of travel directions of navigation devices as belonging to one or more categories from among the set of categories;
       classify, using the classification model, at least one candidate location having an associated distribution of travel directions as belonging to one or more categories from among the set of categories;
       identify, using a second classification model, possible discrepancies in digital map data based on:
          the one or more categories to which belong the some or all of the candidate locations, and
          a similarity between respective categories to which belong each of one or more pairs of proximate candidate locations from among the candidate locations; and
       display, to a user, graphical elements overlaid on a map display, each of the graphical elements identifying a respective at least one of the possible discrepancies in the digital map data.

11. The system of claim 10, wherein:
    some or all of the distributions of travel directions of the plurality of distributions of travel directions and/or the associated distribution of travel directions for the candidate locations are represented via a respective directional histogram;
    each directional histogram includes a plurality of bins;
    each bin of the plurality of bins is associated with a different travel direction for traversal of a corresponding location; and
    each bin stores a representation of a number of devices that traversed the corresponding location in a respective travel direction.

12. The system of claim 10, wherein the at least one processor is further configured to:
    train the second classification model to identify possible discrepancies in digital map data.

13. The system of claim 10, wherein the second classification model is a function $D=F(L(c), \{C_1 \ldots C_k\}, \{L_1 \ldots L_k\})$, where D represents a likelihood of a discrepancy in the digital map data at a candidate location c, the proximate candidate locations of the candidate location c are identified as $\{C_1 \ldots C_k\}$, and the categories to which belong the proximate candidate locations of the candidate location c are identified as $\{L_1 \ldots L_k\}$.

14. The system of claim 13, wherein D includes at least one value representing the likelihood of discrepancy in the digital map data.

15. The system of claim 10, wherein second classification model is or includes a stochastic model.

16. The system of claim 10, wherein the second classification model is or includes a decision tree classifier, a rule-based classifier, a neural network, and/or a support vector machine.

17. The system of claim 10, wherein the set of categories includes: a 1-way road; a 2-way road; a junction; and clutter.

18. A computer-readable medium storing instructions which, when executed by at least one processor of a system, cause the processor to perform a method comprising:

providing a training set including a plurality of distributions of travel directions of navigation devices and a respective category identifier associated with each of the distributions of travel directions, each respective category identifier identifying the associated distribution of travel directions as belonging to one or more categories from among a set of categories;

training, based on the training set, a classification model to classify candidate locations having associated distributions of travel directions of navigation devices as belonging to one or more categories from among the set of categories;

classifying, using the classification model, a plurality of candidate locations having associated distributions of travel directions as belonging to one or more categories from among the set of categories;

identifying, using a second classification model, possible discrepancies in digital map data based on:
  the one or more categories to which belong the some or all of the candidate locations, and
  a similarity between respective categories to which belong each of one or more pairs of proximate candidate locations from among the candidate locations; and displaying, to a user, graphical elements overlaid on a map display, each of the graphical elements identifying a respective at least one of the possible discrepancies in the digital map data.

* * * * *